United States Patent
Gumpoldsberger et al.

(10) Patent No.: US 10,047,840 B2
(45) Date of Patent: Aug. 14, 2018

(54) DUAL-CLUTCH TRANSMISSION THAT CAN BE SHIFTED UNDER FULL LOAD

(71) Applicant: Engineering Center Steyr GmbH & Co KG, St. Valentin (AT)

(72) Inventors: Thomas Gumpoldsberger, Haidershofen (AT); Christian Langsenlehner, Wang (AT); Markus Panhuber, Enns (AT)

(73) Assignee: ENGINEERING CENTER STEYR GMBH & CO KG, St. Valentin (AT)

( * ) Notice: Subject to any disclaimer, the term of this patent is extended or adjusted under 35 U.S.C. 154(b) by 0 days.

(21) Appl. No.: 15/119,142

(22) PCT Filed: Feb. 17, 2015

(86) PCT No.: PCT/EP2015/053320
§ 371 (c)(1),
(2) Date: Aug. 16, 2016

(87) PCT Pub. No.: WO2015/121498
PCT Pub. Date: Aug. 20, 2015

(65) Prior Publication Data
US 2017/0009862 A1    Jan. 12, 2017

(30) Foreign Application Priority Data
Feb. 17, 2014   (DE) .................. 10 2014 202 812

(51) Int. Cl.
*F16H 37/04*   (2006.01)
*F16H 3/00*    (2006.01)
(Continued)

(52) U.S. Cl.
CPC ........... *F16H 37/046* (2013.01); *F16H 3/006* (2013.01); *F16H 3/093* (2013.01); *F16H 3/097* (2013.01);
(Continued)

(58) Field of Classification Search
None
See application file for complete search history.

(56) References Cited

U.S. PATENT DOCUMENTS

2002/0088291 A1*  7/2002  Bowen ................... B60K 6/48
                                              74/339
2004/0149061 A1*  8/2004  Ebenhoch ............... F16H 3/093
                                              74/331
(Continued)

FOREIGN PATENT DOCUMENTS

AT         512785 A4   11/2013
EP        2149725 A2    2/2010

OTHER PUBLICATIONS

International Search Report dated Apr. 24, 2015 from International Patent Application No. PCT/EP2015/053320 (with English translation).

*Primary Examiner* — Colby M Hansen
(74) *Attorney, Agent, or Firm* — Dickinson Wright PLLC

(57) ABSTRACT

A fully power-shiftable double clutch transmission DCT of a drive train for a motor vehicle, in particular for a commercial vehicle having has a drive shaft on the drive side, an output shaft on the output side, and a double clutch which comprises at least two clutches with a main transmission assembly comprising at least two component transmissions. The clutches are connected in each case to an input shaft of a component transmission, the component transmissions, furthermore, preferably spur gears in four input gear planes and two output gear planes and a rear-mounted group. The double clutch transmission, furthermore, comprising a multiplicity of shifting elements, and the double clutch transmission and being of fully power-shiftable configuration with at least 12 gears by way of a suitable arrangement and configuration of the spur gear stages, consisting of movable gear and fixed gear, and the shifting elements.

3 Claims, 2 Drawing Sheets

(51) Int. Cl.
*F16H 3/097* (2006.01)
*F16H 3/093* (2006.01)
*F16H 3/08* (2006.01)

(52) U.S. Cl.
CPC ............ *F16H 2003/0818* (2013.01); *F16H 2003/0826* (2013.01); *F16H 2037/048* (2013.01); *F16H 2200/0078* (2013.01); *F16H 2200/0086* (2013.01)

(56) References Cited

U.S. PATENT DOCUMENTS

| | | | |
|---|---|---|---|
| 2005/0139035 A1* | 6/2005 | Lee | B60K 6/36 74/661 |
| 2006/0054441 A1* | 3/2006 | Ruedle | F16H 3/006 192/48.9 |
| 2006/0169077 A1* | 8/2006 | Gitt | F16H 3/006 74/330 |
| 2007/0180942 A1* | 8/2007 | Antonov | F16H 3/006 74/340 |
| 2013/0053204 A1 | 2/2013 | Slapak | |

* cited by examiner

Fig. 2

| | K1 | K2 | S1 1 | S1 3;9 | S2 2;8 | S2 4;10 | S3 R1,R2 | S3 5;11 | S4 6;12 | S5 R1,5,11 | S5 R2;7 | S6 H | S6 L |
|---|---|---|---|---|---|---|---|---|---|---|---|---|---|
| R1 | | X | | | | | X | | | X | | | X |
| R2 | | X | X | | | | X | | | | X | X | |
| 1 | X | X | | X | | | | | | | | | X |
| 2 | | | | | X | | | | | | | | X |
| 3 | X | X | | X | | | | | | | | | X |
| 4 | X | | | | | X | | | | | | | X |
| 5 | X | X | | | | | | X | | X | | | X |
| 6 | X | | | | X | | | | X | | X | | X |
| 7 | X | X | | | | | | | | | | (X) | |
| 8 | X | | | X | | X | | X | | | | X | |
| 9 | X | X | | | | | | | | X | | X | |
| 10 | X | | | | | | | | X | | | X | |
| 11 | X | X | | | | | | | | | | X | |
| 12 | X | | | | | | | | | | | X | |

DUAL-CLUTCH TRANSMISSION THAT CAN BE SHIFTED UNDER FULL LOAD

CROSS-REFERENCE TO RELATED APPLICATIONS

This application is a U.S. National Stage of International Application No. PCT/EP2015/053320, filed Feb. 17, 2015 and which claims priority to German Application No. DE 10 2014 202 812.4 filed Feb. 17, 2014. The entire disclosure of each of the above listed applications is incorporated herein by reference.

FIELD

The present invention relates to a fully power-shiftable double clutch transmission.

BACKGROUND

Double clutch transmissions are known from the prior art and are used, in particular, in heavy commercial vehicles, in particular heavy trucks.

Known transmission designs of this type which comprise at least 12 gears are known, for example, from EP 2 149 725 A2.

SUMMARY

It is an object of the present invention to develop a double clutch transmission in such a way that the double clutch transmission can be realized with at least 12 gears, comprises a fully power-shiftable configuration and has a compact overall design.

This object is achieved by way of the features which are specified in claim 1.

By way of the features which are specified in claim 1, a double clutch transmission can be provided which has a very satisfactory power-shifting capability. In particular, all shifting transitions of the gear stages and the shifting of the planetary gear assembly of the rear-mounted group can be carried out in a fully power-shiftable manner.

Furthermore, the double clutch transmission according to the invention has a compact overall design. The double clutch transmission is of compact configuration both in the axial direction and in the radial direction. The small overall design in the axial direction can be achieved, in particular, by way of the number of required gearwheel planes and the multiple use of the transmission elements. As a result of the configuration of the gearwheel planes, in each case only one shifting element being arranged on adjacent shafts in a gearwheel plane, the axial spacing of adjacent shafts can be reduced, as a result of which a reduced radial design is achieved overall.

The double clutch transmission can be manufactured inexpensively. The number of transmission elements can be reduced by way of a double utilization of the gearwheel pairs in order to realize different gears.

The double clutch transmission is advantageously configured in such a way that four input constants are assigned to the clutch K2:

K2 with first, third and ninth forward gear via countershaft VW1 and reverse gears R1, R2 and fifth and eleventh forward gear via countershaft VW2

Furthermore, the double clutch transmission is advantageously configured in such a way that two input constants are assigned to the clutch K1:

K1 with second and eighth forward gear and fourth and tenth forward gear via countershaft VW1.

DESCRIPTION OF THE DRAWINGS

One preferred embodiment of the fully power-shiftable double clutch transmission will be described by way of example in the following text, reference being made for illustrative purposes to the appended drawings, in which:

FIG. 2 shows a shift pattern comprising shift logic for realizing the gears which can be realized in accordance with FIG. 1.

FIG. 1 shows a double clutch transmission 1 which comprises a double clutch 6, a main transmission assembly HG and a rear-mounted group. The rear-mounted group NG is configured here as a range group 8 with the possibility of power shifting by means of a bypass stage which is configured as a spur gear stage. By way of the abovementioned embodiment of the double clutch transmission, twelve forward transmission gears of different transmission ratio and two reverse transmission gears can be realized.

Since FIG. 1 is merely a diagrammatic illustration, housing elements, hydraulic supply, actuator system, bearing points, etc. are not shown.

Figure 1:
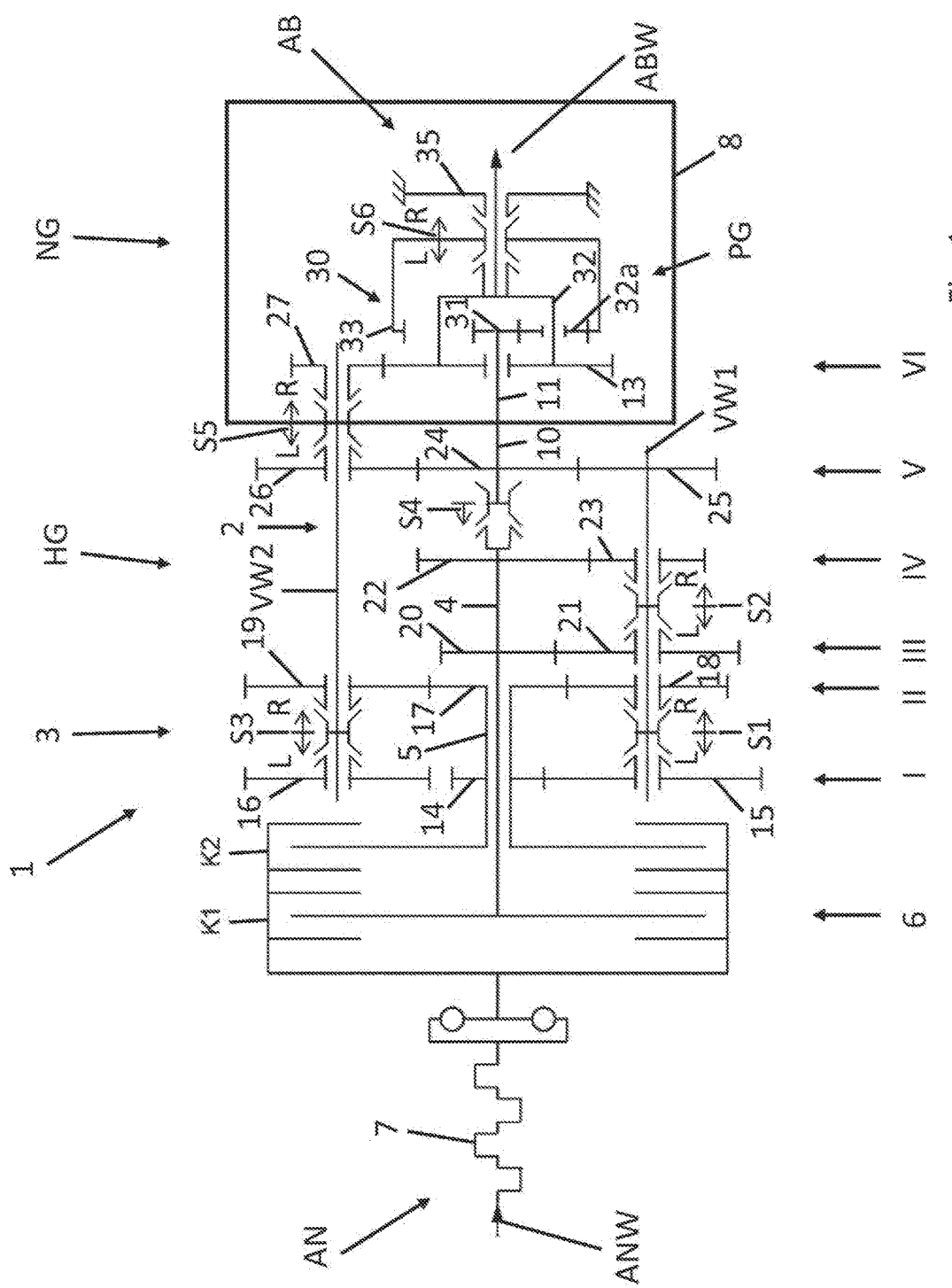
FIG. 1 shows a solution according to the invention of a double clutch transmission in a diagrammatic illustration.

The double clutch transmission 1 which is shown diagrammatically in FIG. 1 is used in a drive train of motor vehicles, in particular commercial vehicles such as trucks. The illustration in FIG. 1 shows a detail from the drive train, the drive side being denoted by AN and the output side of the double clutch transmission 1 being denoted by AB, and having a drive shaft ANW and an output shaft ABW. As can be seen from the diagrammatic illustration of FIG. 1, the double clutch transmission 1 comprises a double clutch, a main transmission assembly HG and a rear-mounted group NG.

In order to realize the gear stages, a multiplicity of gearwheel planes are provided which in each case have different transmission stages. As is known to a person skilled in the art using the symbols, the gearwheel planes of the main transmission assembly and the rear-mounted group usually comprise gearwheel sets which mesh with one another, are configured as spur gears, and are configured such that they are connected or can be connected to in each case one shaft of the main transmission assembly HG or rear-mounted group NG. The gearwheel planes are then called spur gear stages. Accordingly, the term gear stage or gearwheel plane is understood to mean at least two transmission elements which are operatively connected to one another (for example, spur gears which mesh with one another), in order to transmit torques. Forces and/or torques can be transmitted by means of the transmission elements. In particular, gearwheels such as spur gears or the like can be used as transmission elements. Depending on the pairing of the transmission elements or spur gears, a step-down or step-up gear ratio can be achieved for shafts which are connected to the transmission elements. For the sake of simplicity, in the following text the spur gears which are arranged fixedly on a shaft so as to rotate with it are called fixed gears, and the spur gears which are arranged rotatably on a shaft are called movable gears. The movable gears are arranged on a hollow shaft and can be coupled to a coaxially arranged shaft by means of corresponding shifting elements. By means of the shifting elements, the gear planes or transmission elements can be incorporated into the force or torque flow between the drive side and the output side. The desired transmission ratio between the drive side AN and the output side AB of the double clutch transmission 1 can be produced by way of this. Here, the shifting elements S1-S6 can be configured such that they can shift on two sides or on one side. This is shown correspondingly by way of the symbols of the arrows. The shifting elements which are configured on two sides can assume a right-hand, a middle neutral, and a left-hand shifting position. The shifting elements are not described in greater detail at this point, since they are known to a person skilled in the art. The shifting elements S are usually configured as synchronizing elements.

On the drive side AN, the double clutch transmission 1 which is shown in FIG. 1 has a double clutch 6 and a main transmission assembly HG and comprises five gearwheel planes I-V. The latter are configured as spur gear stages. Here, the main transmission shifting group HG comprises two component transmissions 2, 3, each component transmission being assigned an input shaft 4, 5. Here, the first component transmission 2 is coupled to the input shaft 4, and the second component transmission 3 is coupled to the second input shaft 5. Here, the input shafts 4, 5 can be drive-connected via a double clutch 6 to the drive side AN, for example an internal combustion engine. Here, the first component transmission 2 is assigned the gearwheel planes III, IV and V, and the second component transmission 3 is assigned the gearwheel planes I and II.

A rear-mounted group NG is arranged downstream of the main transmission assembly HG on the output side. Here, the rear-mounted group NG comprises a further gearwheel plane VI and a planetary gear assembly PG and is also called a range group 8 in the following text. Two different transmission ratios can be provided by means of the planetary gear assembly PG. The planetary gear assembly PG has a planetary gear set 30 which is configured as a spur gear planetary gear set and comprises a sun gear 31, a planetary gear carrier 32 and an internal gear 33. The planetary gear carrier 32 guides planetary gears 32a on a circular path. The planetary gears 32a are arranged in such a way that they mesh, that is to say are operatively connected, with the sun gear 31 and the internal gear 33.

The double clutch 6 usually consists of two concentrically arranged clutches K1, K2. Each clutch K1 and K2 can connect in each case the drive side AN to an input shaft 4 and 5, respectively. The actuation of the clutches is independent here. Here, the one clutch K1 operates the even gears, and the other clutch K2 operates the odd gears. As can be seen from the drawing, the first set of gears are situated on the inner input shaft 4 which is configured as a solid shaft. The second set of gears is situated on the second input shaft 5. Here, the second shaft 5 is configured as a hollow shaft which is concentric with respect to the first input shaft 4. Therefore, a torque can be transmitted in the engaged gear by way of a clutch K1 or K2, while the next gear can already be preselected. Subsequently, the torque can be switched over in drive terms from the engaged gear to the preselected next gear by way of a clutch K2 or K1 in a manner which is free from traction force interruptions.

An output shaft 10 of the main transmission assembly HG is arranged coaxially with respect to the input shafts 4 and 5. A torque can be conducted out of the main transmission assembly via the output shaft 10 and can be transmitted to the rear-mounted group NG. As can be seen from FIG. 1, the output shaft 10 is the input shaft 11 of the rear-mounted group 8.

Furthermore, the double clutch transmission 1 comprises two countershafts VW1 and VW2. The countershafts VW1 and VW2 are arranged parallel to one another and parallel to the input shafts 4 and 5, and in each case parallel to the output shaft 10. Here, the countershaft VW1 is arranged offset, in parallel with, and below the input shafts 4, 5, and the countershaft VW2 is arranged offset in parallel with, and above the input shafts 4, 5. The countershafts VW1 and VW2 are not arranged equidistantly with respect to the input shafts.

As can be seen from the diagrammatic illustration, the double clutch transmission has four input gearwheel planes I, II, III, IV, the input gearwheel planes I, II being assigned to the second component transmission 3 and the input gearwheel planes III, IV being assigned to the first component transmission. The gearwheel planes I, II, III, IV are arranged on the input side. They are configured as input constants. The input shaft 5 of the clutch K2 and the countershafts VW1 and VW2 can be connected via the gearwheel planes I and II. Four input constants can be realized by way of this. The input shaft 4 of the clutch K1 and the countershaft VW1 can be connected via the gearwheel planes III, IV. Two input constants can be realized by way of this.

The double clutch transmission 1 has two output gearwheel planes V, VI. Here, the gearwheel plane V is assigned to the main transmission shifting group HG and the gearwheel plane VI is assigned to the rear-mounted group NG. By means of the gearwheel plane V, the output shaft 10 is arranged such that it is connected to the countershaft VW1 and can be connected to the countershaft VW2. The gearwheel plane VI has a spur gear 13 which is connected fixedly to the planetary carrier 32 so as to rotate with it, the spur gear 13 being arranged on a hollow shaft which is arranged coaxially with respect to the input shaft 11. Furthermore, the planetary carrier 32 can be connected to the countershaft VW2 via the gearwheel plane VI.

An explanation of the gearwheel planes follows:

The first gearwheel plane I is formed via a fixed gear 14 which is arranged fixedly on the input shaft 5 so as to rotate with it, a movable gear 15 which is arranged rotatably on the countershaft VW1, and a movable gear 16 which is arranged rotatably on the countershaft VW2. The fixed gear 14 and the movable gear 16 mesh with an intermediate gear (not shown) in order to reverse the rotational direction for the reverse gears.

The second gearwheel plane II is formed via a fixed gear 17 which is arranged fixedly on the input shaft 5 so as to rotate with it, a movable gear 18 which is arranged rotatably on the countershaft VW1, and a movable gear 19 which is arranged rotatably on the countershaft VW2.

A shifting element S1 is arranged between the movable gear 15 and the movable gear 18 on the countershaft VW1. By means of the shifting element S1, the movable gear 15 or the movable gear 18 can be coupled to the countershaft VW1; that is to say, depending on the shifting position, the shifting element S1 serves to establish a rotationally fixed operative connection between the movable gear 15 or the movable gear 18 and the countershaft VW1.

The shifting element S1 can assume the following three shifting positions:
connection of movable gear 15 to the countershaft VW1
connection of movable gear 18 to the countershaft VW1, and
neutral, that is to say no connection of either of the two movable gears 15, 18 to the countershaft VW1

A shifting element S3 is arranged between the movable gear 16 and the movable gear 19 on the countershaft VW2. The movable gear 16 or the movable gear 19 can be coupled to the countershaft VW2 by means of the shifting element S3; that is to say, depending on the shifting position, the shifting element S3 serves to establish a rotationally fixed operative connection between the movable gear 16 or the movable gear 19 and the countershaft VW2.

The shifting element S3 can assume the following three shifting positions:
- connection of movable gear 16 to the countershaft VW2
- connection of movable gear 19 to the countershaft VW2, and
- neutral, that is to say no connection of either of the two movable gears 16, 19 to the countershaft VW2

The third gearwheel plane III is formed via a fixed gear 20 which is arranged fixedly on the input shaft 4 so as to rotate with it and a movable gear 21 which is arranged rotatably on the countershaft VW1.

The fourth gearwheel plane IV is formed via a fixed gear 22 which is arranged fixedly on the input shaft 4 so as to rotate with it and a movable gear 23 which is arranged rotatably on the countershaft VW1.

A shifting element S2 is arranged between the movable gear 21 and the movable gear 23 on the countershaft VW1. The movable gear 21 or the movable gear 23 can be coupled to the countershaft VW1 by means of the shifting element S2; that is to say, depending on the shifting position, the shifting element S2 serves to establish a rotationally fixed operative connection between the movable gear 21 or the movable gear 23 and the countershaft VW1.

The shifting element S2 can assume the following three shifting positions:
- connection of movable gear 21 to the countershaft VW1
- connection of movable gear 23 to the countershaft VW1, and
- neutral, that is to say no connection of either of the two movable gears 21, 23 to the countershaft VW1

Between the fourth and fifth gearwheel plane, a shifting element S4 is arranged between the input shaft 4 and the output shaft 10 of the main transmission assembly HG. The shifting element S4 can assume two shifting positions:
- connection of input shaft 4 and output shaft 10
- no connection of input shaft 4 and output shaft 10

The fifth gearwheel plane V is formed via a fixed gear 24 which is arranged fixedly on the output shaft 10 so as to rotate with it, a fixed gear 25 which is arranged fixedly on the countershaft VW1 so as to rotate with it, and a movable gear 26 which is arranged rotatably on the countershaft VW2.

The sixth gearwheel plane VI is formed via a spur gear 13 which is connected fixedly to the planetary carrier 32 of the planetary gear assembly PG so as to rotate with it and a movable gear 27 which is arranged rotatably on the countershaft VW2. The spur gear 13 is arranged on a hollow shaft which is arranged coaxially with respect to the input shaft 11.

A shifting element S5 is arranged between the movable gear 26 and the movable gear 27 on the countershaft VW2. The movable gear 26 or the movable gear 27 can be coupled to the countershaft VW2 by means of the shifting element S5; that is to say, depending on the shifting position, the shifting element S5 serves to establish a rotationally fixed operative connection between the movable gear 26 or the movable gear 27 and the countershaft VW2.

The shifting element S5 can assume the following three shifting positions:
- connection of movable gear 26 to the countershaft VW2
- connection of movable gear 27 to the countershaft VW2, and
- neutral, that is to say no connection of either of the two movable gears 26, 27 to the countershaft VW2

As has already been explained above, the sixth gearwheel plane VI is assigned to the rear-mounted group NG. The output shaft 10 is connected fixedly to the input shaft 11 of the rear-mounted group NG so as to rotate with it. The sun gear 31 of the planetary gear assembly PG is arranged fixedly on the input shaft 11 of the rear-mounted group NG so as to rotate with it. The planetary gear carrier 32 is connected fixedly to the output shaft ABW so as to rotate with it. The internal gear 33 is arranged fixedly on a hollow shaft 34 which is arranged coaxially with respect to the output shaft, so as to rotate with it. The hollow shaft is assigned a shifting element S6.

The shifting element S6 can assume the following three shifting positions:
- connection of internal gear 33 to the planetary carrier 32
- connection of internal gear 33 to a transmission housing 35, as a result of which the internal gear can be connected fixedly to the housing
- neutral, that is to say no connection of the internal gear 33 to the planetary carrier 32 or the transmission housing In the shifting position, in which a connection is established between the internal gear 33 and the planetary carrier 32, the planetary gear set is blocked and has a transmission ratio of one. In the shifting position, in which a connection of the internal gear 33 to the transmission housing 35 is achieved, the planetary gears 32a are driven by way of a drive of the sun gear 31 via the input shaft 11 and are supported in the internal gear 33. As a result, the planetary gear carrier 32 and the output shaft ABW which is connected to the planetary gear carrier 32 are driven. In this shifting position, a transmission ratio of greater than one is therefore provided via the planetary gear set.

FIG. 2 shows a table of the corresponding positions of the shifting elements S1-S6 and of the two clutches K1 and K2 of the double clutch 6. Here, columns for the two clutches K1 and K2 and the six shifting elements are shown horizontally. As a result, the shifting logic of the double clutch transmission 1 for realizing the twelve forward gears and the two reverse gears is shown. Here, the shifting elements can assume a left-hand, a middle and a right-hand position. The locations which are left empty in the table mean that the corresponding shifting element or the clutch is in a neutral, or open position and therefore no forces/torques can be transmitted. A marking in the table which is provided with a cross denotes an actuated shifting element. The reverse gears are numbered with R1 and R2, and the forward gears are numbered from 1-12.

In order to realize the first forward gear, the clutch K2 and the shifting element S1 are shifted into the left-hand position, and the shifting element S6 is shifted into the right-hand position. The further shifting elements are in the neutral position.

In order to realize the second forward gear, the clutch K1 and the shifting element S2 are shifted into the left-hand position, and the shifting element S6 is shifted into the right-hand position. The further shifting elements are in the neutral position.

In order to realize the third forward gear, the clutch K2 and the shifting element S1 are shifted into the right-hand position, and the shifting element S6 is shifted into the right-hand position. The further shifting elements are in the neutral position.

In order to realize the fourth forward gear, the clutch K1 and the shifting element S2 are shifted into the right-hand position, and the shifting element S6 is shifted into the right-hand position. The further shifting elements are in the neutral position.

In order to realize the fifth forward gear, the clutch K2 and the shifting element S3 are shifted into the right-hand position, the shifting element S5 is shifted into the left-hand position, and the shifting element S6 is shifted into the right-hand position. The further shifting elements are in the neutral position.

In order to realize the sixth forward gear, the clutch K1 and the shifting element S4 are shifted into the left-hand position, and the shifting element S6 is shifted into the right-hand position. The further shifting elements are in the neutral position.

In order to realize the seventh forward gear, the clutch K2 and the shifting element S1 are shifted into the left-hand position, the shifting element S5 is shifted into the right-hand position and, additionally as an alternative, the shifting element S6 is shifted into the left-hand position. The further shifting elements are in the neutral position.

In order to realize the eighth forward gear, the clutch K1 and the shifting element S2 are shifted into the left-hand position, and the shifting element S6 is shifted into the left-hand position. The further shifting elements are in the neutral position.

In order to realize the ninth forward gear, the clutch K2 and the shifting element S1 are shifted into the right-hand position, and the shifting element S6 is shifted into the left-hand position. The further shifting elements are in the neutral position.

In order to realize the tenth forward gear, the clutch K1 and the shifting element S2 are shifted into the right-hand position, and the shifting element S6 is shifted into the left-hand position. The further shifting elements are in the neutral position.

In order to realize the eleventh forward gear, the clutch K2 and the shifting element S3 are shifted into the right-hand position, the shifting element S5 is shifted into the left-hand position, and the shifting element S6 is shifted into the left-hand position. The further shifting elements are in the neutral position.

In order to realize the twelfth forward gear, the clutch K1 and the shifting elements S4 and S6 are shifted into the left-hand position. The further shifting elements are in the neutral position.

In order to realize the first reverse gear R1, the clutch K2 and the shifting elements S3 are shifted into the left-hand position, the shifting element S5 is shifted into the left-hand position, and the shifting element S6 is shifted into the right-hand position. The further shifting elements are in the neutral position.

In order to realize the second reverse gear R2, the clutch K2 and the shifting element S3 are shifted into the left-hand position, the shifting element S5 is shifted into the right-hand position, and the shifting element S6 is shifted into the left-hand position. The further shifting elements are in the neutral position.

The invention claimed is:

1. A power-shiftable double clutch transmission for a drive train of a motor vehicle, comprising:
   a drive shaft being rotatable for being coupled with an engine at a drive side of the transmission;
   a final output shaft being rotatable on an output of the transmission;
   a first input shaft and a second input shaft;
   a first switchable clutch selectively coupling the drive shaft and the first input shaft, and a second switchable clutch selectively coupling the drive shaft and the second input shaft;
   a first output shaft;
   a first component transmission coupling the first input shaft and the first output shaft, and a second component transmission coupling the second input shaft and the first output shaft;
   the first component transmission having at least one first gearwheel plane providing a change in a gear ratio between the first input shaft and the first output shaft, and the second component transmission having at least one second gearwheel plane providing a change in a gear ratio between the second input shaft and the first output shaft;
   the at least one first gearwheel plane positioned along a first countershaft and the at least one second gearwheel plane positioned along a second countershaft, wherein the first and second countershafts are positioned in parallel relationship with one another;
   a planetary gear assembly coupling the first output shaft and the final output shaft;
   the planetary gear assembly including a sun gear fixed to the first output shaft;
   the planetary gear assembly further including plurality of planet gears meshed with and rotatable about the sun gear, and a planetary carrier connected to the planet gears and fixed to the final output shaft;
   the planetary gear assembly further including an internal gear meshed with and positioned about the planet gears;
   a first shifting element fixed to the internal gear and positioned adjacent to the planetary carrier and moveable for selectively coupling the internal gear and planetary carrier;
   a spur gear connected to and rotatable with the planetary carrier;
   a first moveable gear disposed about the second countershaft and meshed with the spur gear;
   a second shifting element moveable for selectively coupling the first moveable gear and the second countershaft;
   a first fixed gear fixed to the first output shaft for rotation with the first output shaft;
   a second fixed gear disposed about the first countershaft and meshed with the first fixed gear;
   a second moveable gear disposed about the second countershaft;
   the second shifting element further being moveable for selectively coupling the second moveable gear and the second countershaft;
   a third shifting element positioned between the first input shaft and the first output shaft and moveable for selectively coupling the first input shaft and the first output shaft.

2. The power-shiftable double clutch transmission as set forth in claim 1, wherein the at least one first input gearwheel plane includes two input gear planes, and wherein the at least one second input gearwheel plane includes two second input gearwheel planes.

3. A power-shiftable double clutch transmission as set forth in claim 1 wherein the at least one first gearwheel plane of the first component transmission includes a fixed gear which is fixed on the second input shaft so as to rotate with the second input shaft, a third movable gear is disposed rotatably on the first countershaft, and a fourth movable gear is disposed rotatably on the second countershaft, and the at least one second gearwheel plane includes a second fixed gear fixed about the second input shaft so as to rotate with the second input shaft, a fifth movable gear is positioned rotatably on the first countershaft, and a sixth movable gear is positioned rotatably on the second countershaft, and a fourth shifting element is fixed to the second countershaft between the fourth moveable gear and the sixth movable gear and moveable for connecting the fourth moveable gear and the second countershaft and for connecting the sixth moveable gear and the second countershaft, and a fifth shifting element fixed to the first countershaft between the third moveable gear and the fifth movable gear and the fifth movable gear and moveable for connecting the third moveable gear and the first countershaft and for connecting the fifth moveable gear and the first countershaft.

* * * * *